(12) United States Patent
Moncelle

(10) Patent No.: US 6,523,529 B1
(45) Date of Patent: Feb. 25, 2003

(54) INTEGRATION OF AIR SEPARATION MEMBRANE AND COALESCING FILTER FOR USE ON AN INLET AIR SYSTEM OF AN ENGINE

(75) Inventor: Michael E. Moncelle, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/036,661

(22) Filed: Dec. 21, 2001

(51) Int. Cl.[7] .............................................. F02M 27/00
(52) U.S. Cl. .......................... 123/539; 55/524; 60/274; 96/6; 96/11
(58) Field of Search .................................. 123/585, 539; 60/274; 96/6, 11; 55/524

(56) References Cited

U.S. PATENT DOCUMENTS 6,289,884 B1    9/2001   Blandino et al. ........... 123/585

Primary Examiner—Noah P. Kamen
(74) Attorney, Agent, or Firm—Taylor & Aust.

(57) ABSTRACT

An intake air separation system suitable for combustion air of an internal combustion engine. An air separation device of the system includes a plurality of fibers, each fiber having a tube with a permeation barrier layer on the outer surface thereof and a coalescing layer on the inner surface thereof, to restrict fluid droplets from contacting the permeation barrier layer.

20 Claims, 3 Drawing Sheets

INTEGRATION OF AIR SEPARATION MEMBRANE AND COALESCING FILTER FOR USE ON AN INLET AIR SYSTEM OF AN ENGINE

The Government of the United States of America has rights in this invention pursuant to Contract No. DE-FC05-00OR22806 awarded by the U.S. Department of Energy.

TECHNICAL FIELD

The present invention relates to intake air separation systems for internal combustion engines, and more particularly, to an intake air separation system that includes an air separation membrane adapted to produce streams of oxygen enriched air and nitrogen enriched air integrated with a coalescing filter to remove liquids.

BACKGROUND

Exhaust emission regulations have become increasingly restrictive, and internal combustion engine manufacturers are faced with competing interests in having to meet the emissions requirements while providing acceptable engine performance, including fuel efficiency. Exhaust emissions include visible smoke, particulate matter and oxides of nitrogen ($NO_x$). Particulate matter includes unburned hydrocarbons and soot, while $NO_x$ emissions are a somewhat indefinite mixture of oxides of nitrogen, which may include primarily NO and $NO_2$. Many approaches have been used to address emissions issues, including fuel injection, combustion control strategies and systems, after treatment systems and exhaust gas recirculation (EGR) systems.

Attempts at solving one issue can have a negative impact on others. For example, emission reduction systems often have a negative effect on fuel efficiency. To improve fuel efficiency, or power density, it is known to increase the amount of oxygen in the combustion chamber. This has been done in the past by pressurizing the combustion air provided to the combustion chamber. Pressurization of the combustion air increases the oxygen available for combustion. Turbochargers have been used for this purpose.

After treatment of exhaust gas can be used to reduce the amount of unburned hydrocarbons by continuing oxidation of the unburned hydrocarbons. A secondary air supply can be provided to the exhaust stream. The already high temperature of the exhaust stream will support further combustion with the introduction of additional oxygen in the exhaust gas stream. A trade-off occurs in that while particulate matter may be reduced, the further oxidation creates still higher temperatures in the exhaust system. The design of exhaust systems for these higher temperatures requires components able to withstand a much hotter environment. Such components are often heavy and expensive, and may require more frequent servicing.

Decreased fuel consumption and decreased particulate production often go hand-in-hand. However, at the same time, $NO_x$ production often increases. $NO_x$ forms when nitrogen mixes in a high temperature environment with excess oxygen not used in the combustion process. Therefore, while excess oxygen and high combustion temperatures are beneficial in reducing fuel consumption, the same combination is detrimental in terms of increased $NO_x$ formation. Engine manufactures must strike a delicate balance whereby $NO_x$ production, fuel consumption and particulate matter formation are controlled to meet emissions regulations and engine user demands.

$NO_x$ reduction has been accomplished using exhaust gas recirculation (EGR). By introducing EGR flow to the combustion chamber, the amount of available oxygen for formation of $NO_x$ is reduced. By reducing the amount of oxygen, the combustion process is slowed, thereby reducing the peek temperatures in the combustion chamber. EGR systems typically use exhaust gas, but may also use enriched nitrogen sources.

U.S. Pat. No. 6,289,884 "INTAKE AIR SEPARATION SYSTEM FOR AN INTERNAL COMBUSTION ENGINE" issued Sep. 18, 2001, discloses a method and system for intake air separation in an internal combustion engine. An intake air separation device utilizes a membrane to separate the intake air into a flow of oxygen enriched air and a flow of nitrogen enriched air. A purge air circuit is used to deliver a flow of sweep air or purge air to the intake air separation device, thereby increasing the effectiveness of the air separation.

One of the problems associated with the use of air separation membranes is the accumulation of tiny droplets of fluids (aerosols) on the surfaces of the membranes, with the resultant decrease of separation efficiency. Aerosols can originate from lubrication of upstream equipment, such as compressors, and from the condensation of water or other vapors present in the gas stream being separated. In stationary and process systems that use air separation membrane technology, the problem can be overcome through the use of separate coalescing filters to remove the aerosols upstream of the separation membrane. Known designs for such coalescing filters are large relative to the volume of the air stream being processed, and have large pressure drops associated with the air streams passed therethrough. Because of the filter size and associated pressure drop, use of separate coalescing filters in most engine applications employing air separation membranes has not been practical.

The present invention is directed to overcoming one or more of the problems as set forth above.

SUMMARY OF THE INVENTION

In one aspect of the invention, an intake air separation system provides nitrogen enriched air for a combustion process within an internal combustion engine. The intake air separation system is provided with an intake air input adapted to provide intake air used in the combustion process for the engine. An intake air separation device is in flow communication with the intake air input, and is adapted for receiving the intake air and separating the intake air into an oxygen enriched air stream and a nitrogen enriched air stream. The intake air device includes an integral coalescing filter. A permeate outlet is in fluid communication with the intake air separation device, and adapted to receive the oxygen enriched air stream. A retentate outlet is in fluid communication with the intake air separation device and the intake manifold.

In another aspect of the invention, a method of separating an intake air flow in an internal combustion engine having an intake air system adapted for providing intake air to an intake manifold and one or more combustion chambers, has steps of: providing an intake air separation device including a permeation barrier layer; directing the intake air to the intake air separation device; in the air separation device, at the permeation barrier layer, dividing the intake air into an oxygen enriched air stream and a nitrogen enriched air stream; providing a coalescing layer in the intake air separation device for restricting liquid droplets from reaching the permeation barrier layer; and passing liquid droplets from the air separation device with the nitrogen enriched air stream.

In still another aspect of the invention, a gas separation device for separating an incoming gas stream into an first gas constituent stream and a second gas constituent stream is provided with a shell, an inlet in the shell for receiving the incoming gas stream, a permeate outlet from the shell for the first gas constituent stream and a retentate outlet from the shell for the second gas constituent stream. A plurality of fibers are disposed in the shell, each adapted to receive a portion of the incoming gas stream. Each the fiber includes a permeation barrier layer adapted for separating the portion of the incoming gas stream into an first gas constituent stream and a second gas constituent stream, and a coalescing layer restricting the passage of liquid droplets to the permeation barrier layer.

In a yet further aspect of the invention, an internal combustion engine is provided with a combustion section including a plurality of combustion chambers, an exhaust system including an exhaust conduit, an intake manifold, and an intake air separation system adapted for providing a nitrogen enriched air stream for a combustion process within the plurality of combustion chambers. The intake air separation system has an intake air input adapted to provide the intake air used in the combustion process for the engine. An intake air separation device is in flow communication with the intake air input, and is adapted for receiving the intake air and separating the intake air into an oxygen enriched air stream and a nitrogen enriched air stream. The intake air separation device includes an integral coalescing filter. A permeate outlet is in fluid flow communication with the intake air separation device, and is adapted to receive the oxygen enriched air stream. A retentate outlet is in fluid flow communication with the intake air separation device and the intake manifold, and is adapted to provide the nitrogen enriched air stream to the intake manifold for use in the combustion process.

DETAILED DESCRIPTION

Figure 1:
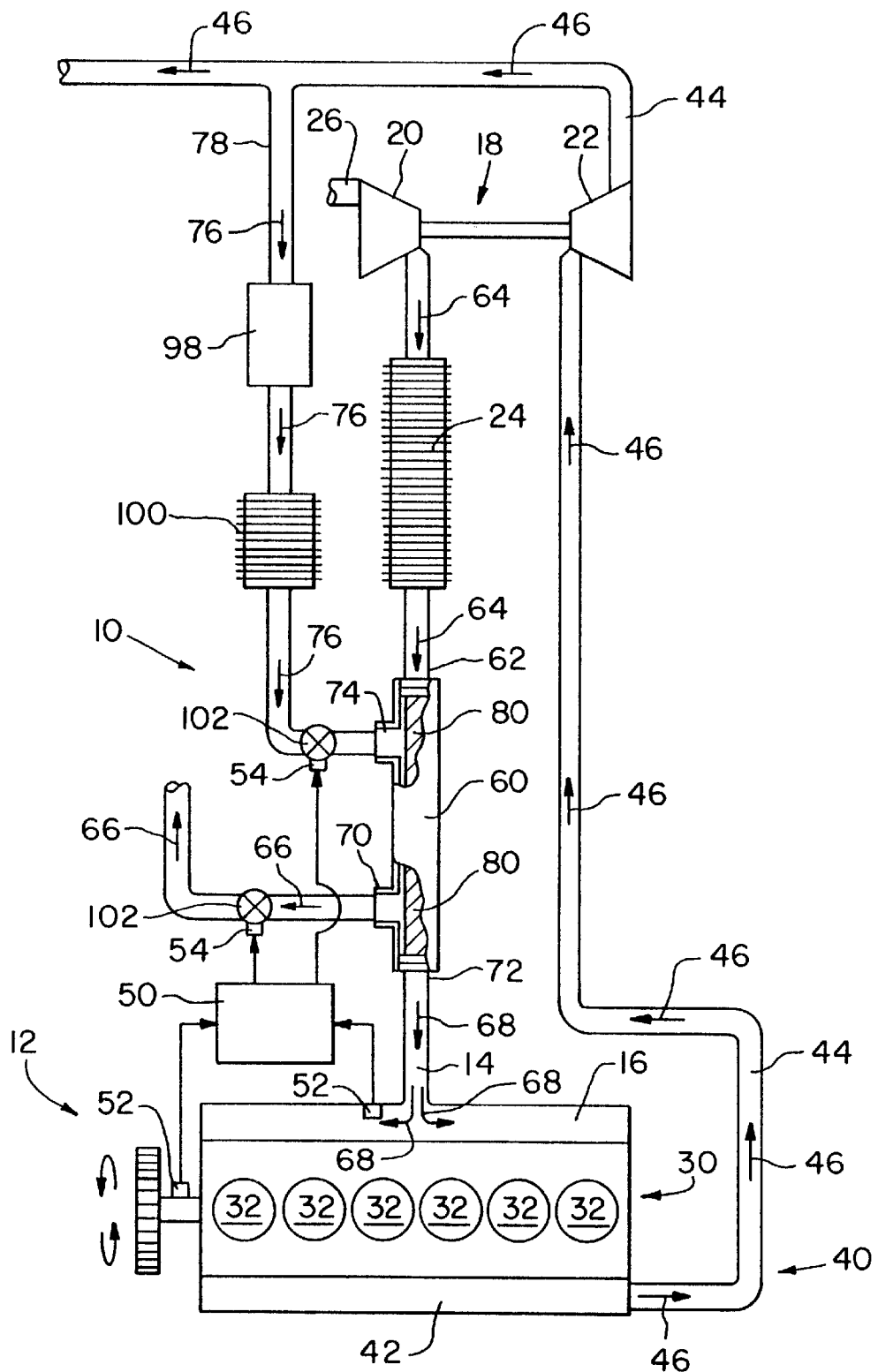
FIG. 1 is a schematic illustration of an internal combustion engine having an inlet air system with an integrated air separation membrane and coalescing filter of the present invention.

Turning now to the drawings, and particularly to FIG. 1, there is shown a schematic diagram of an intake air separation system 10 for a heavy-duty diesel engine 12.

An intake side of diesel engine 12 includes an intake air conduit 14, an intake manifold 16 and an intake air pressurizing device 18, such as a turbocharger that includes an intake air compressor 20 connected to, and driven by an exhaust gas driven turbine 22. An inter-cooler or an air to air aftercooler (ATAAC) 24 is provided in intake air conduit 14, between compressor 20 and intake manifold 16. Air compressor 20 receives intake air from an intake air input 26.

Engine 12 further includes a main combustion section 30 which includes, among other elements, an engine block and a cylinder head forming a plurality of combustion chambers 32 therein. A fuel introduction means such as a fuel injector, port injection or manifold introduction of the fuel; a cylinder liner; at least one intake port and corresponding intake valves; at least one exhaust port and corresponding exhaust valves; and a reciprocating piston movable within each chamber 32 are provided or associated with each combustion chamber 32.

An exhaust system 40 includes an exhaust manifold 42 or split exhaust manifolds, and one or more exhaust conduits 44 carrying an exhaust gas stream, indicated by arrows 46, from exhaust manifold 42. Exhaust conduit 44 conducts exhaust gas stream 46 to turbine 22, for driving turbine 22 in known manner. Exhaust conduit 44 conducts exhaust gas stream 46 away from turbine 22 for further use, as will be described, and for subsequent discharge. Optionally, exhaust system 40 may further include one or more after treatment devices (not shown) such as particulate traps, $NO_x$ absorbers, oxidation and/or leaned $NO_x$ catalysts or other such devices.

An engine control module (ECM) 50 is provided for operatively controlling the fuel injection timing and air system valve operations in response to one or more measured or sensed engine operating parameters. For providing input data to ECM 50, one or more sensors 52 are provided, sensing various engine operating conditions at various engine locations. For example, one such sensor 52 is shown in intake manifold 16, but may be provided elsewhere in intake air system 10 to provide intake air pressure data to ECM 50. Other sensors 52 may be temperature sensors, oxygen sensors, or the like, as those skilled in the art will understand readily, to provide the necessary input information relating to operating conditions of engine 12. In addition, engine 12 includes various valves, filters, actuators, bypass circuits and the like which are operatively coupled to ECM 50 by operators 54, to be controlled in response to a variety of engine operating conditions, such as engine speed, engine load, boost pressure conditions and the like.

While the present intake air separation system 10 is shown and described for use on a heavy duty six cylinder in-line four stroke direct injection diesel engine, numerous other engine types may be used, including alternate fuel engines, gasoline engines, natural gas engines, two stroke engines, dual fuel engines and the like. The engine configurations may include in-line and/or v-type engines, as well as various modifications in the number of combustion chambers 32 provided.

In the embodiment shown in FIG. 1, intake air conduit 14 is in flow communication with intake air input 26, compressor 20 of turbocharger 18 and ATAAC 24. Although intake air separation system 10 is shown and described in conjunction with a turbocharged diesel engine, system 10 is equally useful on engines with a variable geometry turbocharger (VGT) or other supercharged engines.

Intake air separation system 10 includes an intake gas or air separation device 60 adapted for receiving combustion air at an inlet 62 of separation device 60. Within separation device 60, the incoming gas stream, which in the embodiment illustrated is a combustion air stream indicated by arrows 64, is separated into a first gas constituent stream and a second gas constituent stream. Combustion air stream 64 can be all of the required combustion air for engine 12, or at least a portion of the required combustion air in a system (not shown) in which some combustion air is allowed to bypass separation device 60. In system 10, the first gas constituent stream is an oxygen enriched air stream designated by arrows 66, and the second gas constituent stream is a nitrogen enriched air stream designated by arrows 68, which leave separation device 60 via a permeate outlet 70 and a retentate outlet 72, respectively. In other uses of the present invention, the first and second gas constituent streams may be other then oxygen and nitrogen enriched gases.

A purge gas inlet 74 is also provided, to provided a purge gas, or sweep gas flow, indicated by arrows 76, to enhance the permeation effectiveness of separation device 60. Purge inlet 74 is connected via a purge gas conduit 78 to exhaust conduit 44, thereby supplying exhaust gas as purge gas flow 76. It should be understood that purge gas flow 76 also can be provided from sources other than exhaust conduit 44. For example, clean air from the inlet side of compressor 20 can also be used, in which case purge gas conduit 78 would be connected to receive a flow of air from intake air input 26. Purge gas flow 76 substantially combines with the permeate flow, or oxygen enriched air stream 66, leaving separation device 60 via permeate outlet 70.

Intake air separation device 60 preferably uses selectively permeable separation membranes 80 that separate an incoming gas stream into first and second streams enriched in different gases. For engine 12 as illustrated, membranes 80 are selected for the ability to separate ambient intake air into streams of oxygen enriched air and nitrogen enriched air. Such membranes 80 are well-known in the art, as evidenced by the disclosures in U.S. Pat. No. 5,649,517 (Pools et al.); U.S. Pat. No. 5,526,641 (Sekar et al.); U.S. Pat. No. 5,640,845 (Ng et al; and U.S. Pat. No. 5,147,417 (Nemser); and a publication by K. Stork and R. Poola entitled "Membrane-Based Air Composition Control for Light Duty Diesel Vehicles", Center for Transportation Research Argonne National Library (October 1998).

Figure 2:
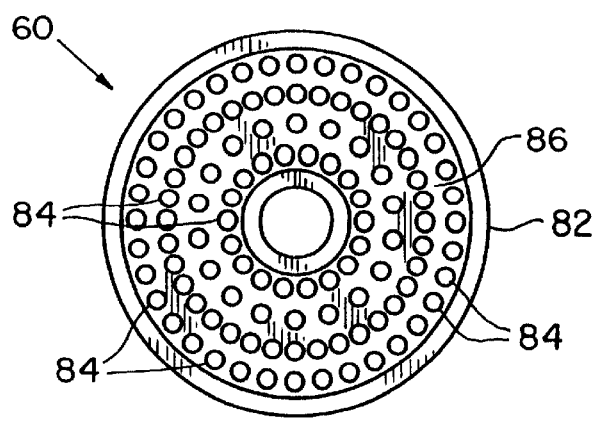
FIG. 2 is an end view of the air separation device shown in FIG. 1.
Figure 3:
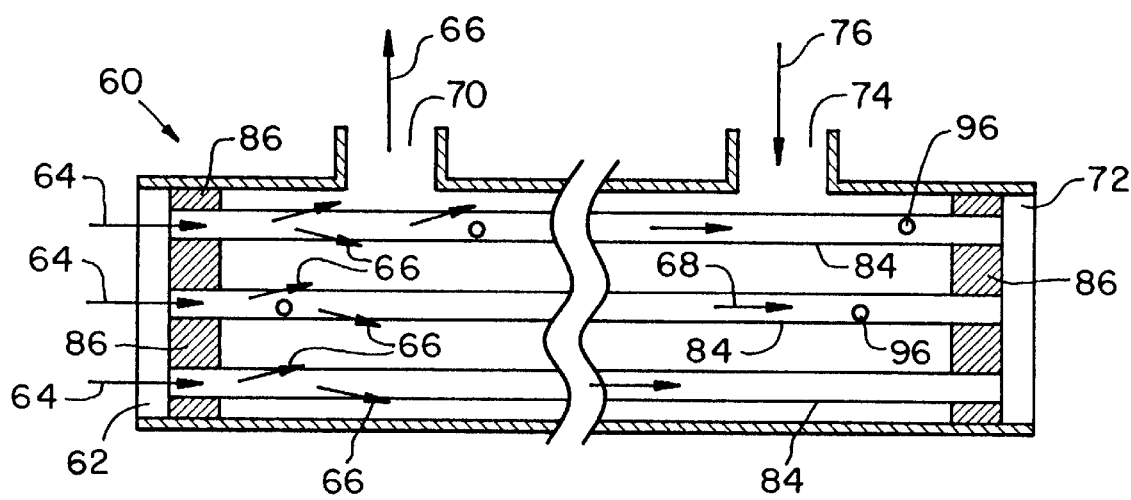
FIG. 3 is a schematic illustration, in longitudinal cross-section, of the device shown in FIG. 2.
Figure 4:
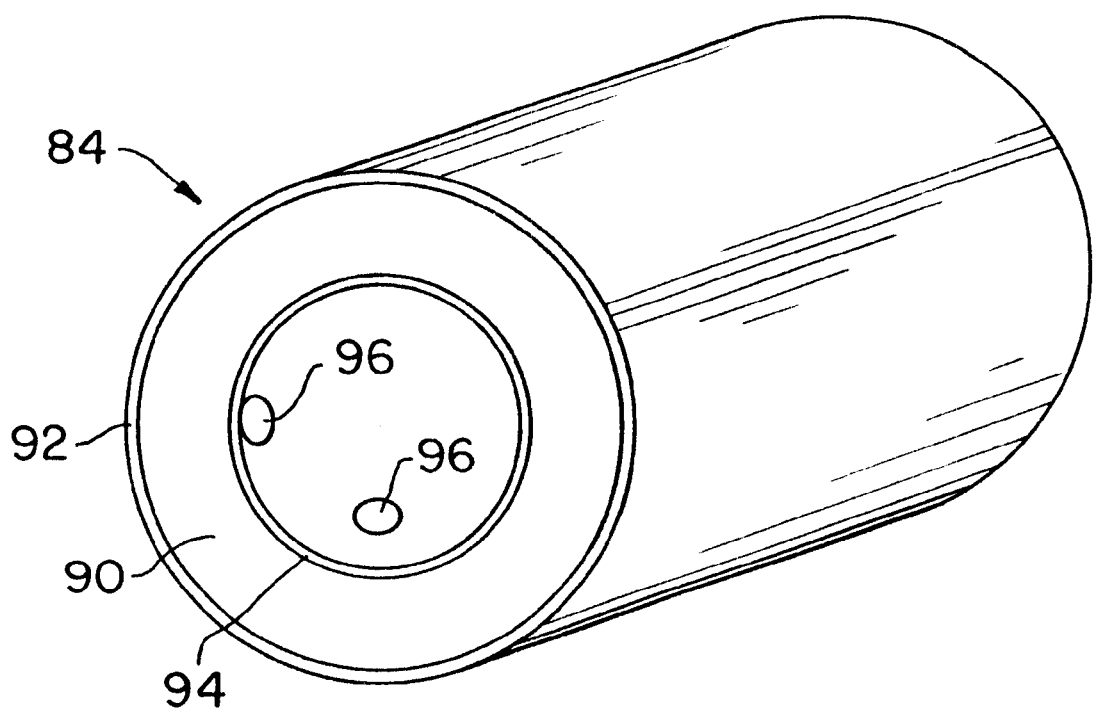
FIG. 4 is an enlarged perspective illustration of one fiber of the air separation device.

As seen in FIGS. 2, 3 and 4, air separation device 60 includes a housing or shell 82 having combustion air inlet 62, purge gas inlet 74, permeate outlet 70 and retentate outlet 72 therein. Membrane 80 includes a plurality of selectively permeable fibers 84 that are disposed in a general longitudinal or helical orientation within housing 82, and are imbedded at each end in potting material 86. The use of potting material 86 is advantageous in ease of manufacture and assembly; however, other sealing substances can also be used. For example, an elastomeric end sheet having holes seated around each hollow fiber 84 can also be used. Only several of fibers 84 have been identified in FIG. 2, for clarity. Combustion air stream 64 can enter device 60 only by flowing into hollow fibers 84, in that the area between fibers 84 is sealed by potting material 86.

As shown in FIG. 4, fibers 84 are hollow, porous, structures through which selected gases permeate outwardly relatively rapidly, while other gases permeate outwardly comparatively slowly, and tend to be retained in and transported the length of the structures. Of importance to intake air separation system 10, oxygen trends to permeate fibers 84 more quickly than does nitrogen.

Each fiber 84 includes a highly permeable tube 90, forming the structural element of the fiber. A permeation barrier layer 92 is provided on the outer surface of tube 90. Layer 92 is a selective barrier to the permeation of gases therethrough, and is therefore responsible for the separation of combustion air stream 64 in to oxygen enriched air stream 66 and nitrogen enriched air stream 68. A coalescing filter is provided in the manner of a coalescing layer 94 on the inner surface of each tube 90. Incoming combustion air stream 64 is first exposed to coalescing layer 94, and any aerosol or other liquid is coalesced into small droplets 96 that accumulate on coalescing layer 94. Coalescing layer 94 restricts the migration of liquids and aerosols through tube 90 to permeation barrier layer 92.

Combustion air stream 64 is introduced into intake air separation device 60 generally at an end of housing 82 and fibers 84, to flow through the lengths thereof Oxygen tends to permeate fibers 84, while nitrogen does not. Purge gas flow 76 is introduced to air separation device 60 on the permeate sides of fibers 84.

To properly condition the exhaust gas for use in air separation device 60 as purge gas flow 76, a particulate filter 98 (FIG. 1), for removing contaminants, and a heat exchanger 100, for conditioning the temperature of the gas, are provided in purge gas conduit 78.

Further, flow control devices, such as valves 102 can be used to control flow of combustion air stream 64, oxygen enriched air stream 66, nitrogen enriched air stream 68 and purge gas flow 76. Exemplary valves 102 are shown in the drawings at various locations, and, again those skilled in the art will understand readily that more or fewer valves 102 may be used.

INDUSTRIAL APPLICABILITY

In the use and operation of an intake air separation system 10 of the present invention, fuel is supplied to combustion chambers 32 along with combustion air, as will be described, and the combination of fuel and combustion air is combusted in known manner. Exhaust gas from chambers 32 is discharged to exhaust manifold 42, and flows to exhaust conduit 44. Exhaust gas stream 46 in exhaust conduit 44 flows through turbine 22, supplying power to rotate turbine 22. In turn, turbine 22 drives compressor 20, in known manner Intake air is drawn in through intake air input 26 to compressor 20 and is compressed therein and discharged to intake conduit 14. Combustion air stream 64 flows through intake conduit 14 and ATAAC 24 to air separation device 60. Lubrication oils provided in compressor 20 can become entrained in the airflow through compressor 20. Further, temperature changes along the process can result in the condensation of gas into liquids, which also become entrained in combustion air stream 64. If not removed, the tiny droplets of liquids accumulate on membrane 80, and specifically permeation barrier layer 92, decreasing the separation efficiency thereof.

Combustion air stream 64 enters device 60 at inlet 62, and flows through fibers 84. The selective permeability of fibers 84 divides combustion air stream 64 into oxygen enriched air stream 66, which includes those gases having permeated fiber 84, and specifically permeation barrier layer 92 thereof, which then flow to permeate outlet 70; and nitrogen enriched air stream 68, which includes those gases unable to permeate fiber 84, and specifically permeation barrier layer 92 thereof, before the reaching retentate outlet 72.

Aerosols and other fluid droplets entrained in combustion air stream 64 are coalesced on coalescing layer 94, and are restrained from passing through tube 90 to reach layer 92. The air flow through each fiber 84 causes droplets 96 on coalescing layer 94 to migrate toward retentate outlet 72. Positioning air separation device 60 in at least a minimally vertical orientation, with inlet 62 at a higher position than retentate outlet 72, assists in moving droplets 96 toward retentate outlet 72. Under most conditions, droplets 96 can pass to combustion chambers 32 with no deleterious effects on the combustion process in combustion chambers 32.

It should be understood that while the function of fibers 84 has been described as separating combustion air stream 64 into oxygen enriched air stream 66 and nitrogen enriched air stream 68, each of the separated air streams will include many gases other than oxygen and nitrogen, respectively. Oxygen enriched air stream 66 is more rich than nitrogen enriched air stream 68 in gases that readily permeate fibers 84, such as, for example, hydrogen, water vapors and carbon dioxide in addition to oxygen. Nitrogen enriched air stream 68 is more rich than oxygen enriched air stream 66 in gases that do not permeate fibers 84 readily, such as, for example, carbon monoxide and nitrogen. Further, it is not a definitive separation of gases. For example, not all oxygen permeates fibers 84. Sufficient oxygen remains in nitrogen enriched air stream 68 to support combustion in combustion chambers 32.

Some exhaust gas from exhaust gas stream 46 enters purge gas conduit 78, becoming purge gas flow 76, and flows through purge gas conduit 78 to purge gas inlet 74 of air separation device 60. Purge gas flow 76 enters air separation device 60 on the permeate side of fibers 84. Purge gas flow 76, being exhaust gas from combustion in combustion chambers 32, has a low oxygen content and a high nitrogen content.

Among the factors that influence the permeation rates of gases through fibers 84 are the partial gas pressures of the gases on opposite sides of fibers 84. By providing on the permeate side of fibers 84 a sweep or purge gas flow 76 which is high in nitrogen content and low in oxygen content, the permeation rates of oxygen and nitrogen through fibers 84 are influenced. By using purge gas flow 76 as described, a higher rate of oxygen permeation is achieved without an increase in rate of nitrogen permeation. Thus, particularly at high loads on engine 12, a higher oxygen flux can be achieved without an increase in nitrogen flux. Alternatively, less fiber 84 surface is required for a given retentate nitrogen purity requirement, with a corresponding reduction in fuel consumption due to the reduction in total mass flux across fibers 84.

Device 60, with appropriate membranes 80, can be used to separate an incoming gas stream into a first gas constituent stream and a second gas constituent stream for gases other than oxygen and nitrogen, and for processes other than supplying a combustion air stream for an engine. The use of a coalescing layer 94 in accordance with the present invention provides advantages for the separation of gas streams in these alternative situations as well. Further, while the invention has been shown and described with membrane 80 associated with hollow fibers 84, membrane 80 can also be used as a barrier between opposite sides thereof in arrangements other than tubes, and coalescing layer 94 associated therewith will provide advantages. The flow can be opposite to that shown, with the incoming gas stream provided on the outside of tubes 90, in which case permeation barrier layer 92 and coalescing layer 94 will be reversed in position, with coalescing layer 94 on the outside of tube 90 and permeation barrier layer 92 on the inside of tube 90. Coalescing layer 94 is provided between the incoming gas stream and permeation barrier layer 92, in the gas flow direction.

The present invention provides enhanced performance of an air separation membrane by removing aerosols or tiny liquid droplets present in the air stream subjected to separation. Removal is done efficiently, without the need for large, separate devices, and without the resultant significant pressure drop often associated with separate coalescing filters.

Other aspects, objects and advantages of this invention can be obtained from a study of the drawings, the disclosure and the appended claims.

What is claimed is:

1. An intake air separation system adapted for providing nitrogen enriched air for a combustion process within an internal combustion engine having an intake manifold, said intake air separation system comprising:
    an intake air input adapted to provide intake air used in said combustion process for said engine;
    an intake air separation device in flow communication with said intake air input, and adapted for receiving said intake air and separating said intake air into an oxygen enriched air stream and a nitrogen enriched air stream, said intake air separation device including an integral coalescing filter;
    a permeate outlet in fluid communication with said intake air separation device, and adapted to receive said oxygen enriched air stream; and
    a retentate outlet in fluid communication with said intake air separation device and said intake manifold, said retentate outlet adapted to provide said nitrogen enriched air stream to said intake manifold for use in said combustion process.

2. The intake air separation system of claim 1, said intake air separation device including a plurality of hollow fibers having integral coalescing filters.

3. The intake air separation system of claim 2, said fibers each having a tube, a permeation barrier layer and a coalescing layer.

4. The intake air separation system of claim 3, said permeation barrier layers disposed on outer surfaces of said tubes and said coalescing layers disposed on inner surfaces of said tubes.

5. The intake air separation system of claim 4, said intake air separation device having a shell, with said tubes disposed in said shell, and said tubes having ends embedded in potting material.

6. The intake air separation system of claim 5, said intake air separation device having an inlet for said intake air, and said inlet air separation device disposed with said inlet at a higher elevation than said retentate outlet.

7. The intake air separation system of claim 1, said intake air separation device having an inlet for said intake air, and said inlet air separation device disposed with said inlet at a higher elevation than said retentate outlet.

8. The intake air separation system of claim 1, including a compressor in fluid flow communication between said intake air input and said intake air separation device.

9. A method of separating an intake air flow in an internal combustion engine, said engine having an intake air system adapted for providing intake air to an intake manifold and one or more combustion chambers, said method comprising the steps of:
    providing an intake air separation device including a permeation barrier layer;
    directing the intake air to the intake air separation device;
    in the air separation device, at said permeation barrier layer, dividing the intake air into an oxygen enriched air stream and a nitrogen enriched air stream;
    providing a coalescing layer in the intake air separation device for restricting liquid droplets from reaching the permeation barrier layer; and
    passing liquid droplets from the air separation device with the nitrogen enriched air stream.

10. The method of claim 9, including exposing the intake air to the coalescing layer prior to exposing the intake air to the permeation barrier layer.

11. A gas separation device for separating an incoming gas stream into an first gas constituent stream and a second gas constituent stream, said gas separation device comprising;

a shell;

an inlet in said shell for receiving the incoming gas stream into said shell, a permeate outlet from said shell for the first gas constituent stream;

a retentate outlet from the shell for the second gas constituent stream; and a plurality of fibers disposed in said shell, each said fiber adapted to receive a portion of said incoming gas stream, each said fiber including;

a permeation barrier layer adapted for separating the portion of the incoming gas stream into an first gas constituent stream and a second gas constituent stream; and a coalescing layer restricting the passage of liquid droplets to said permeation barrier layer.

12. The gas separation device of claim 11, each said fiber having a hollow tube, with said permeation barrier layer disposed on an outer surface of said hollow tube and said coalescing layer disposed on an inner surface of said hollow tube.

13. The gas separation device of claim 12, each said hollow tube disposed in a bed of potting material at said inlet, to direct the incoming air stream to flow into said tubes.

14. An internal combustion engine comprising:

a combustion section including a plurality of combustion chambers;

an exhaust system including an exhaust conduit;

an intake manifold;

an intake air separation system adapted for providing a nitrogen enriched air stream for a combustion process within said plurality of combustion chambers, said intake air separation system including;

an intake air input adapted to provide the intake air used in said combustion process for said engine;

an intake air separation device in flow communication with said intake air input, and adapted for receiving said intake air and separating said intake air into an oxygen enriched air stream and a nitrogen enriched air stream, said intake air separation device including an integral coalescing filter;

a permeate outlet in fluid flow communication with said intake air separation device, and adapted to receive said oxygen enriched air stream; and a retentate outlet in fluid flow communication with said intake air separation device and said intake manifold, said retentate outlet adapted to provide said nitrogen enriched air stream to said intake manifold for use in said combustion process.

15. The internal combustion engine of claim 14, including a turbocharger have a compressor providing pressurized intake air to said intake air separation device, and a turbine powered by exhaust gas flow through said exhaust conduit.

16. The internal combustion engine of claim 15, said intake air separation device including a plurality of hollow fibers having integral coalescing filters.

17. The internal combustion engine of claim 16, said fibers each having a tube, a permeation barrier layer and a coalescing layer.

18. The internal combustion engine of claim 17, said permeation barrier layers disposed on outer surfaces of said tubes and said coalescing layers disposed on inner surfaces of said tubes.

19. The internal combustion engine of claim 17, said intake air separation device having a shell, with said tubes disposed in said shell, and said tubes having ends embedded in potting material.

20. The internal combustion engine of claim 19, said intake air separation device having an inlet for said intake air, and said inlet air separation device disposed with said inlet at a higher elevation than said retentate outlet.

* * * * *